Aug. 31, 1926.
A. R. KEARNEY ET AL
1,597,803
APPARATUS FOR FILLING MOLDS AND THE LIKE WITH PLASTIC MATERIAL
Filed August 18, 1924   4 Sheets-Sheet 1
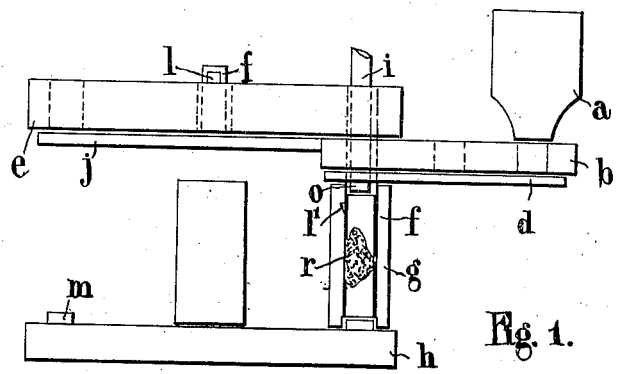
Fig. 1.
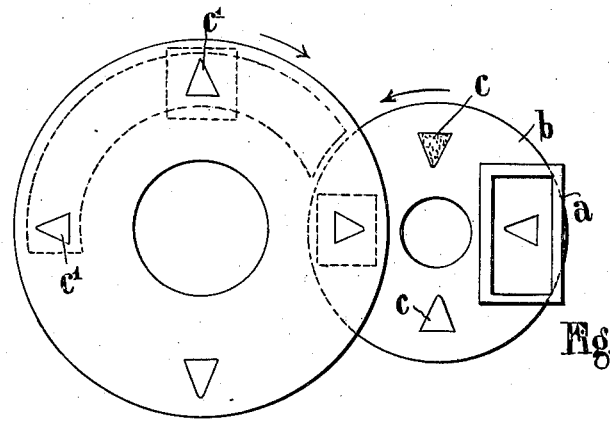
Fig. 2.
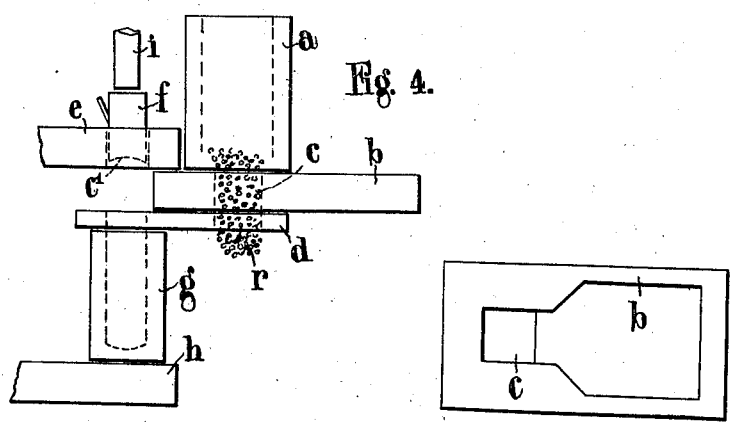
Fig. 4.
Fig. 6.
Inventors
A. R. Kearney
C. W. Taylor
By Marks & Clerk Attys.

Aug. 31, 1926.
1,597,803
A. R. KEARNEY ET AL
APPARATUS FOR FILLING MOLDS AND THE LIKE WITH PLASTIC MATERIAL
Filed August 18, 1924    4 Sheets-Sheet 2

Inventors
A. R. Kearney
C. W. Taylor

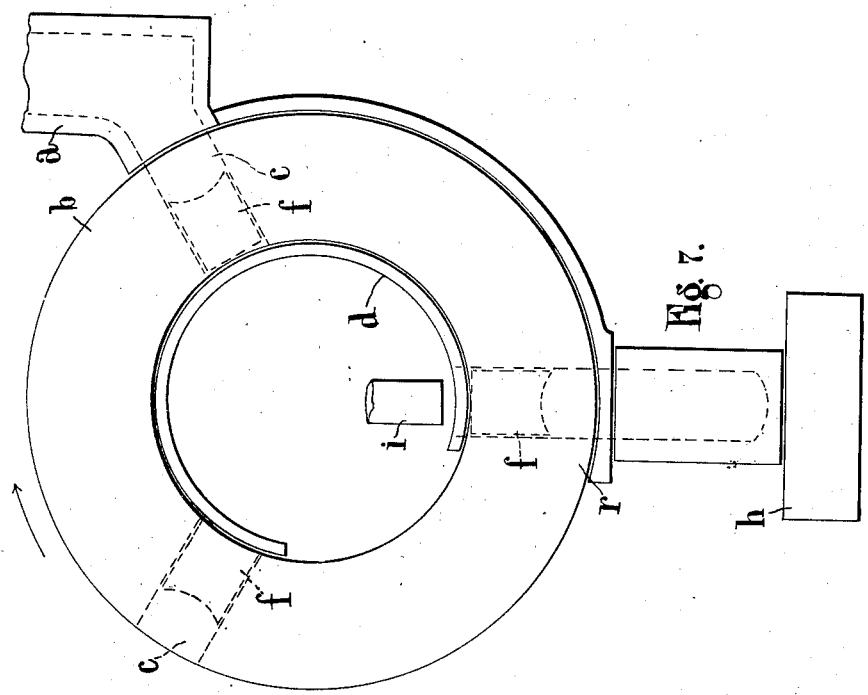

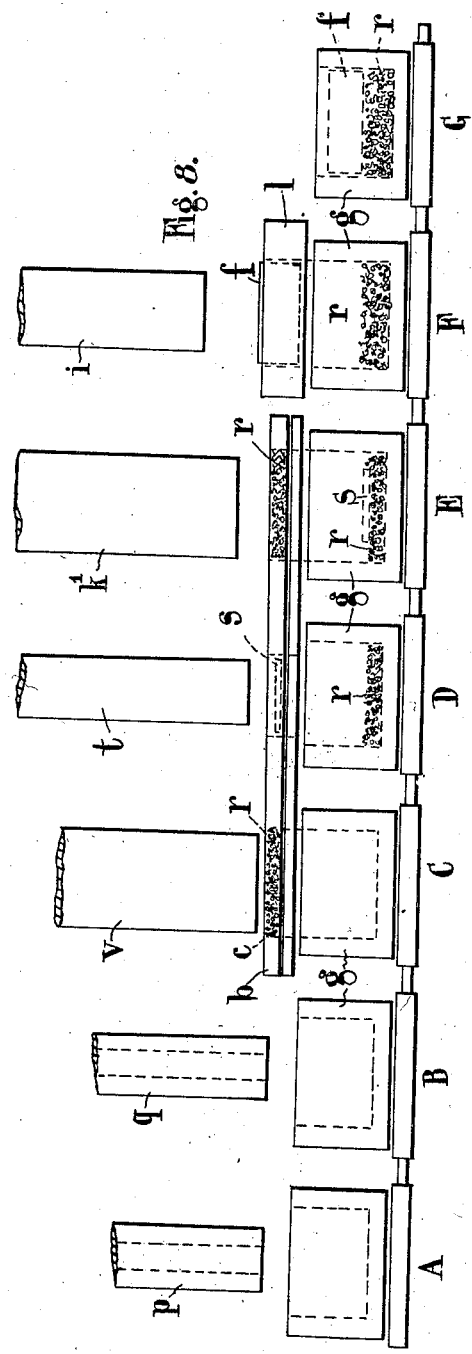

Patented Aug. 31, 1926.

1,597,803

UNITED STATES PATENT OFFICE.

ARTHUR RICHIE KEARNEY AND CHARLES WILLIAM TAYLOR, OF LONDON, ENGLAND.

APPARATUS FOR FILLING MOLDS AND THE LIKE WITH PLASTIC MATERIAL.

Application filed August 18, 1924, Serial No. 732,813, and in Great Britain August 18, 1923.

This invention relates to apparatus for filling molds, dies and the like with viscous, plastic or semi-fluid material.

More particularly this invention relates to the filling of molds with raw or uncured rubber.

The object of the present invention is to produce a simple and compact apparatus for filling molds, dies or the like with such viscous, plastic or semi-fluid material which will materially reduce the cost of labour in making the molded articles of such material.

The invention consists in the improvements in the apparatus hereinafter described and more particularly pointed out in the claims.

In carrying the invention into effect, the material is placed in a hopper or the like which is supplied with means whereby the said material may be forced out of an exit provided at one end. Co-operating with the exit is provided a member having one or more measuring chambers which are so formed that the quantity of material contained therein which has been forced out from the hopper is the exact amount required for filling into the mold. Said measuring chamber or chambers are so arranged that they coincide with the entrance to the mold which it is desired to fill, or are capable of movement when filled so that they register with the entrance to the mold. Means are provided either in the shape of fluid or mechanical pressure whereby the material forced into the measuring chamber may be pressed into the mold. These means are preferably in the form of a plunger, but compressed air or other fluid may be employed if desired.

Between the material contained in the chamber and the means for forcing said material into the mold is preferably interposed a member hereinafter called the mold ram, which is acted upon by the plunger or other means to press the material into said mold. This mold ram is made of the same cross-section as the measuring chamber and also the entrance to the mold so that the said mold ram can be pressed by means of the plunger or other means through the chamber into the mold, thus pressing the material so as to completely fill the interior of the mold. The mold ram when forced into position in the mold is locked therein by means of a catch, spring or other suitable device. In this manner the exact quantity of material is measured from the hopper and is forced into the mold without any intermediate handling.

The invention will now be described with reference to the accompanying drawings, which show diagrammatically by way of example an apparatus for filling molds, dies or the like with material and in which:—

Figure 1 is an elevation of an apparatus for filling molds showing the measuring chambers mounted upon a rotatable disc;

Figure 2 is a plan of Figure 1;

Figure 4 is an elevation showing the measuring chamber mounted in a reciprocating member;

Figure 6 is a detail of the measuring chamber;

Figure 7 is a modification of Figure 3 in which a single cylindrical member is used in the place of the two members $b$ and $e$; and Figure 8 is a view showing diagrammatically the various operations in an automatic filling apparatus.

Figure 3:
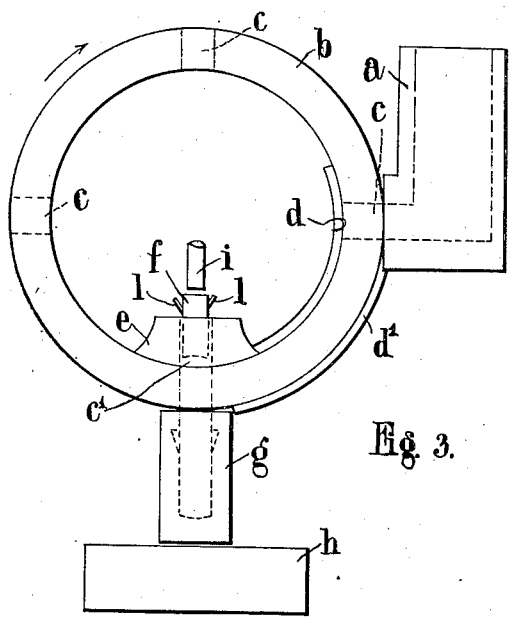
Figure 3 is a modification in which the rotatable disc is replaced by a cylindrical member.

Referring more especially to Figures 1 and 2, which illustrate one embodiment of the invention, a hopper $a$ for the material is provided which is mounted so as to register with the four measuring chambers $c$ provided in a disc-shaped member $b$, which is rotatably mounted upon a shaft so that the chamber $c$ can be brought into the required position. Each chamber $c$ is made so that it contains the exact quantity of material for correctly forming the article in the mold.

Upon another rotatably mounted disc member $e$ situated upon an axis parallel to that of $b$, are provided four chambers $c'$ similar to those in the disc member $b$. Into these chambers $c'$ are fed, by any suitable means, mold rams $f$ which have the same cross-section as the chambers $c'$ and are adapted to be removed therefrom by means of plungers $i$. The plungers $i$ are operated by mechanical means or by fluid or other pressure. If desired the plungers $i$ may be dispensed with and the fluid or other pressure may act directly on the rams $f$.

When the chamber $c$ in the disc member $b$ has been filled with material, the pressure in the hopper is released and the member $b$ is rotated so that the filled chamber registers with the chamber $c'$ in the member $e$ which contains a mold ram $f$. The pressure need not be released if other means are provided so that the material does not escape from the hopper; for instance, the face of the disc member $b$ may be used for this purpose. This movement shears or cuts the material clear away from the hopper. On the other side of the disc member $b$ is mounted a shield member $d$ which acts to prevent the material forced from the hopper $a$ from escaping through the opposite side of the chamber $c$. This member $d$ is stationary. A similar shield member $j$ is provided to prevent the mold rams $f$ from escaping from the chambers $c'$ before they arrive at the filling position.

Registering with the chamber $c$ and the member $b$ is placed a mold $g$ having a channel leading into its interior so that the entrance to said channel coincides with the chambers $c$ and $c'$ so that when the mold ram $f$ is pressed by the plunger $i$ the material together with the mold ram $f$ will be pressed into the mold. The mold $g$ is mounted upon a rotating disc member $h$ which may be geared with the members $e$ and $d$ so that the molds $g$ may be brought to coincide with the chambers $c$, $c'$ in the filling position. The member $h$ is provided with locating pieces or spigots $m$ on which the molds $g$ are mounted, the number of molds mounted upon the member corresponding to the number of chambers $c'$ upon the member $e$.

The member $d$ is provided with an aperture so as to allow the material and mold ram to pass therethrough, said hole registering in the filling position with the chambers $c$, $c'$ and the entrance to the mold. The apparatus may be worked in a vertical position as shown or in a horizontal position if desired.

Any suitable means may be provided in the hopper $a$ whereby the material may be forced out therefrom into the chambers $c$.

The disc members $b$, $e$ and $h$ are connected together by suitable gearing so as to rotate at the same speed either in the same or opposite directions and an intermittent motion is imparted to them so as to position the chambers $c$ in front of the hopper for filling, the chambers $c'$ for receiving mold rams, and spigots $m$ for receiving molds, and subsequently to position the chamber $c$, the chamber $c'$, and the entrance to the molds so that they register in line for filling.

The number of chambers in the disc members $b$ and $e$ are shown the same in Figures 1 and 2, but any number may be used and may differ for each member as long as the gearing is so arranged that the filling of the chambers and the pressing out of the material therefrom can take place at the same time after every intermittent motion of the said members.

Similarly the member $h$ can be provided with any number of locating pieces for molds and may be geared so that a mold coincides with the chambers $c$ and $c'$ after each intermittent motion of said disc members.

Alternatively the members $b$, $e$ and $h$ may be all independent of one another and separate means, hand or mechanically operated, may be provided for moving them into the various positions.

The mold ram when pressed into position by the plunger $i$ is locked in the said mold $g$ by means of a spring $l$ which is secured to the mold ram and springs into a recess $l'$ in the mold. Any other pawl or catch arrangement may be employed to lock the ram in position. Thus, for instance, the ram may be provided with a notch in which a spring or the like can be forced or the ram itself may be made hollow and the exterior end split or otherwise so that projections integral with said ram may spring into appropriate recesses.

The cross-section of the mold ram is made to exactly correspond with the cross-section of the channel leading into the mold so that when the mold ram is pressed into position in the mold no material can escape as the ram is an exact fit in the mold.

The surface of the mold ram which is in contact with the material is made so that its contour coincides with the contour of the interior of the mold, thus forming when in position part of the mold itself.

Should it happen that the locking device $l$ which holds the mold ram $f$ in the mold fails to act, the material compressed in the mold will expand and push back the mold ram so that it may project beyond the mold and foul the shield $d$. In order to overcome this difficulty the mold ram is so arranged that when it is in the locked position its outer end is below the entrance to the mold, thus leaving a safety space $o$.

When it is desirable to have the mold ram flush with the outside or protruding beyond the mold, the plunger $i$ should not be withdrawn until the mold has been removed from the filling position.

The mold ram may be of any shape or form and may have one or more apertures for inserting articles which it is required to incorporate in the finished molded article. The mold ram may consist of an article which it is desired to insert permanently into the material so as to become an integral part of the finished molded article.

According to another embodiment of the invention, the measuring chambers are provided in a cylindrical member $b$ as shown in Figure 3 of the drawings. This member is operated similarly to that in Figures 1 and 2 and registers first with the hopper $a$ and secondly with the member $e$ and the mold $g$, the member $e$ in this case being stationary and having its chamber $c'$ fed either automatically or by hand with a mold ram $f$.

To prevent the material forced into the chamber $c$ from passing out through the other side of the chamber $c$ a shield $d$ is provided on the inside of the member $b$ and on the outside another shield $d'$ is provided to prevent the material on the rotation of the member $b$ from falling out before reaching the mold $g$. On the member $h$ is mounted the mold $g$. This member $h$ may be provided with means whereby the molds can be mounted thereon and moved into the filling position which is shown in Figure 3.

Alternatively to the arrangement of the members $e$ and $h$, the member $h$ may be mounted so as to be inside the member $b$ and member $e$ outside. In this case the plunger $i$ is operated from the outside of the cylinder to insert the mold ram $f$.

It is frequently found that the material to be molded, is, as in the case of rubber, very tough and difficult to work and it often happens that the chambers $c$ are not completely filled with material when said material is forced from the hopper $a$ as the leading surface of the material takes a convex form. The material thus does not completely fill the chamber and therefore a sufficient quantity of material is not measured off and transferred to the mold.

In order to overcome this difficulty, the shield $d$ shown in Figure 4 is provided with an aperture corresponding to the section of the chamber $c$. The material is pressed out of the hopper into the chamber $c$ and excess of this will escape through the aperture in $d$. This excess is returned to the hopper by any suitable means. Upon the movement of the member $b$ the material will be sheared off or cut by the relative movement between $b$ and $d$, thus forming a flat surface, thereby completely filling the chamber $c$ with material.

In Figure 4 the member $b$ is shown as a reciprocating member which may have one or more chambers $c$, the member $b$ when filled being moved to coincide with the chamber $c'$ in the member $e$ and the entrance to the mold $g$, the member $e$ in this case being stationary and means being provided whereby the mold rams $f$ are fed to the chamber $c'$ for pressing into the molds.

Alternatively the member $e$ may rotate similarly to that shown in Figure 1, as also the member $h$.

The arrangement shown in Figure 4 of securing the complete filling of the chamber $c$ may equally well be applied to other modifications of the invention.

Figure 5:
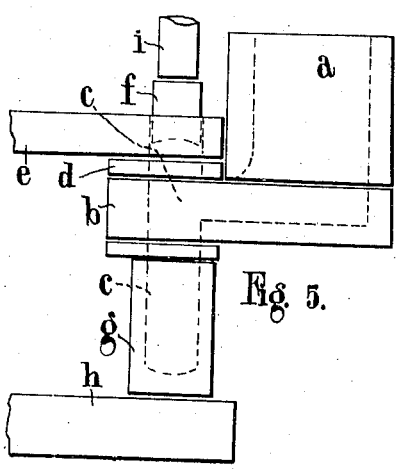
Figure 5 is a modification of Figure 3 having the measuring chamber stationary.

According to a further embodiment of the invention, as illustrated in Figure 5, the measuring chamber $c$, the member $h$ on which the mold $g$ is mounted, and the chamber $c'$ are stationary and therefore always in register with one another. In order to bring the molds and mold rams into position, they may be mounted upon movable disc or cylindrical members in which case the chamber $c$ is only stationary. The hopper $a$ is placed at one side of the member $e$ and the chamber $c$ communicates therewith by means of a duct or other passage in the member $b$ as shown in Figure 6. The material is forced from the hopper through the duct into the chamber $c$, the correct quantity of material being forced from said chamber $c$ by means of the mold ram $f$ which shears the material from the duct and only presses the correct quantity into the mold. When the mold $g$ is filled another mold is brought into the filling position on the member $h$ either by hand or mechanical means, and the operation is repeated.

According to a further embodiment of the invention illustrated in Figure 7, the member $b$ is cylindrical in form and the chambers $c$ therein are used for containing the mold ram $f$ as well as the required quantity of material. Thus the chamber $c'$ in the member $e$ is eliminated as well as the member $e$ itself. Three chambers $c$ are provided and the member $b$ is given three intermittent motions to complete one revolution.

Firstly the mold ram $f$ is fed by hand or other mechanical means into the chamber $c$. Secondly the member $b$ is moved to the position in which the chamber $c$ containing the ram $f$ coincides with the exit from the hopper $a$. In this second position the material is forced into the space left in the chamber $c$ which is not occupied by the mold ram $f$. Thirdly, when the material is thus filled into the chamber $c$, the member $b$ is given another intermittent motion to bring it into the filling position. In this position the plunger $i$ located in the interior of the member $b$ is operated by mechanical or fluid means, or by hand if desired, to force the mold ram and the material into the mold $g$.

Guard members $d$ and $d'$ are provided on the interior and exterior respectively of the member $b$ to keep the mold ram and the material in their respective positions. At the same time as the material is being fed into the chamber $c$ a further mold ram $f$ is fed into the chamber $c$. Similarly when this second chamber $c$ has been brought to coincide with the hopper $a$ a third mold ram is inserted into the third chamber. Thus, the operation of inserting mold rams, filling material, and pressing material and mold ram into the mold, is continuous.

According to the embodiment shown diagrammatically in Figure 8, a number of molds $g$ are placed on a conveyor member $h$ so as to be intermittently fed past a number of plungers for executing different operations.

The plunger $p$, as shown in the position A of the mold, is provided with heating means so that as the mold $g$ comes underneath the plunger this is lowered so as to heat the mold. The plunger $p$ is then removed and the mold is moved on to the position B. In this position it is under the plunger $q$ which is provided with means so that the interior of the mold may be dressed with chalk, collodion or other substance. This substance is fed into the plunger and is ejected therefrom by any suitable known means.

In the position C the mold is brought under the chamber $c$ which is filled with material $r$. This chamber $c$ is mounted on a suitable member $b$ which may be similar to any of the modifications hereinbefore described. In this position the material is pressed into the mold $g$ by the plunger $v$.

In the position D a plate $s$ of metal or other suitable material which it is required to incorporate in the finished article is inserted by means of a plunger $t$ into the mold $g$.

In the position E a further quantity of material $r$ is fed from a chamber $c$ by means of a plunger $w$ into the mold $g$, which will then incorporate the plate $s$ into the finished article.

In the position F the mold ram $f$ is fed into the mold by means of a plunger $i$, the mold ram $f$ being mounted in the member $e$ and brought into position by any suitable means.

The final position G shows the mold ready for the curing process, such as baking in the case of rubber.

The arrangement shown in Figure 8 may be worked automatically or the operations may be independent of one another. Thus, if required, various operations can be executed by hand while others are worked mechanically. The various plungers are reciprocated by any suitable means situated above them which may be mechanical or a fluid under pressure.

In the modifications described above one hopper has been referred to, but a plurality of hoppers may be used if desired each with its coacting measuring chambers and molds, in which case a plurality of chambers and molds will be filled simultaneously in one apparatus. The molds used in connection with the various apparatus described previously may be of any known type.

In order to facilitate the insertion of the material into said molds they may be provided with a small air vent to allow the air to escape. Said air vent may be always open if it is sufficiently small or, if large, may be opened or closed by automatic means. Further, a vacuum may be applied to the interior of the mold for assisting in the insertion of the material.

In cases where a large quantity of material is required to fill the molds the material retained in one or more chambers may be inserted into the molds before the insertion of the mold ram. Any of the modifications described hereinbefore may be used to accomplish this.

In the case where the mold rams are inserted after the material has been pressed into the mold by the plungers or other means it is not necessary for the mold rams to pass through the measuring chambers $c$ and therefore the chambers need not be made to conform to the exact section of the mold ram.

Any articles such as metal, wood or the like may be inserted and incorporated into the material during the process of insertion or after. These articles may be inserted in one or more operations.

The various embodiments shown in the drawing have been more particularly described with reference to the molding of india-rubber but they can be equally well used for papier mâché or materials for making ebonite or for any other viscous, plastic or semi-fluid material.

It is well known that in molding operations certain materials, such as rubber for instance, have to be heated and kept at an approximately constant temperature so that the material may be plastic enough to be worked. In order to provide for this, heating means of any known type may be employed to keep the material at the correct temperature during the various operations.

It is to be understood that the construction and details of the arrangement of parts may be varied from those described hereinbefore without departing from the spirit of the invention.

Having now described our invention, what we claim as new and desire to secure by Letters Patent is:—

1. In an apparatus for filling molds with plastic material such as rubber and the like, the combination comprising detachable molding means, measuring means for supplying the material to said molding means, closing means for securing said material within said molding means, and means for simultaneously registering said closing and measuring means with said molding means, as set forth.

2. In an apparatus for filling molds with plastic material such as rubber and the like, the combination comprising detachable molding means, measuring means for supplying the material to said molding means, closing means for securing said material within said molding means, means for simultaneously registering said closing and measuring means with said molding means, and automatic locking means for retaining said closing means in said molding means, as set forth.

3. An apparatus for filling molds with plastic material such as rubber and the like comprising in combination a plurality of detachable molds, a plurality of measuring chambers, means for causing said molds and chambers to register for filling purposes, a plurality of closing members for securing said material within said molds and means for forcing said closing members through said measuring chambers into said molds, as set forth.

4. An apparatus for filling molds, dies and the like with viscous, plastic and semi-fluid materials such as india-rubber, comprising in combination a hopper containing the material, measuring means adapted to be filled from the hopper, detachable molding means, closing means for securing said material within said molding means, means for simultaneously registering the measuring means, the closing means and the molding means, and means for forcing the measured quantity of said material together with the closing means into said molding means, as set forth.

5. An apparatus for filling molds with plastic material such as india-rubber and the like comprising in combination a hopper, a plurality of movable measuring chambers adapted to be filled from said hopper, a plurality of detachable molds mounted upon a movable member, a plurality of closing members for securing said material within said molds, means causing said molds, closing members and measuring chambers to simultaneously register, and means for forcing said material together with said closing members into said molds, as set forth.

6. In an apparatus for filling molds with plastic material such as india-rubber and the like, the combination comprising a plurality of detachable molds, a plurality of measuring chambers open at each end, means for shearing off said material flush with the two ends of said measuring chambers, a plurality of closing members for securing said material within said molds, means for causing said molds, closing members and measuring chambers to simultaneously register, and means for forcing said closing members and said material simultaneously into said molds, as set forth.

7. An apparatus for filling molds with plastic material such as india-rubber and the like comprising in combination a hopper, a plurality of measuring chambers in a rotatable member, a plurality of removable molds mounted upon a rotatable member, and a plurality of closing members for securing said material within said molds mounted loosely upon a rotatable member, the three said members co-acting so that the closing members and material are both forced into said molds in one operation, as set forth.

8. In an apparatus for filling molds with plastic material such as india-rubber and the like, the combination comprising a plurality of detachable molds, a plurality of measuring chambers rotatably mounted so as to register with said molds, a plurality of closing members for securing said material within said molds, means for forcing said closing members through said measuring chambers into said molds, and locking means for retaining said closing members in said molds, as set forth.

In testimony whereof we have signed our names to this specification.

ARTHUR RICHIE KEARNEY.
CHARLES WILLIAM TAYLOR.